June 13, 1961   T. J. THOMAS   2,988,719
FLUID POTENTIOMETER FOR VERTICAL REFERENCE SYSTEM
Filed Dec. 24, 1959
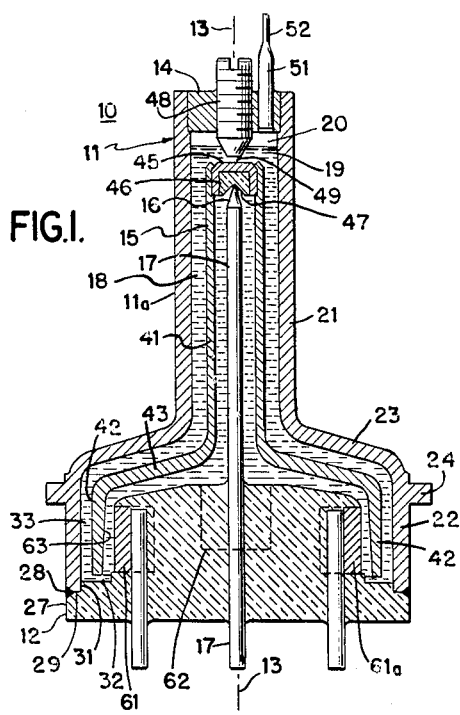
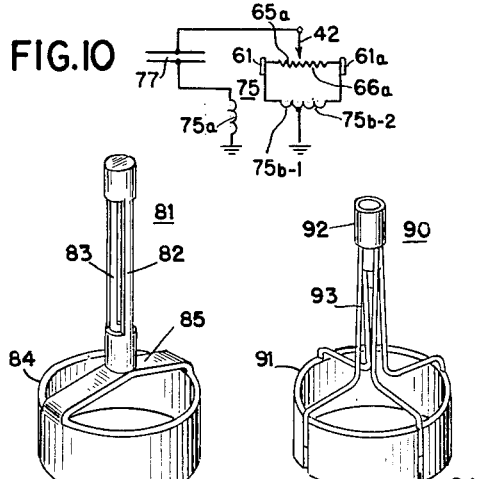
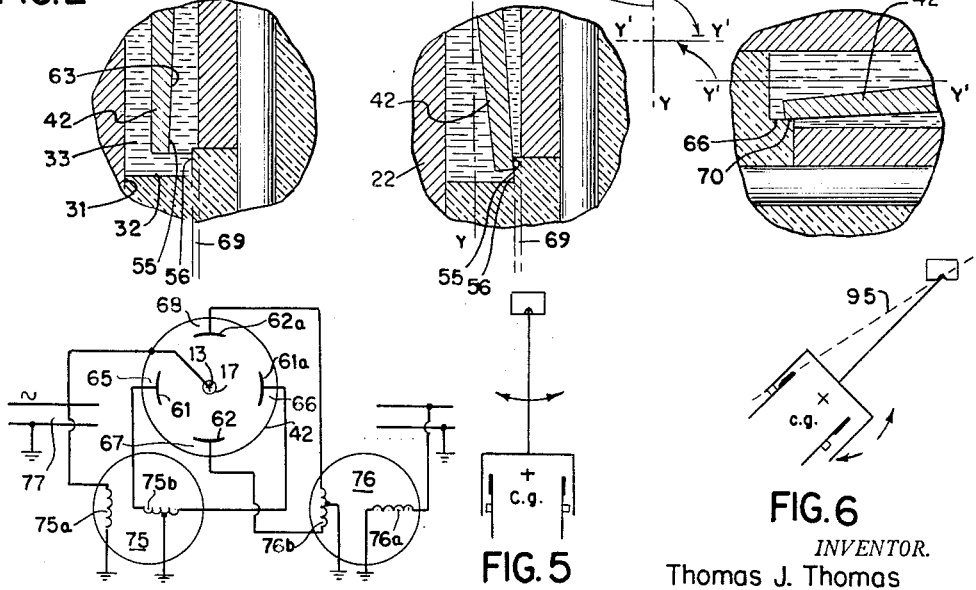
INVENTOR.
Thomas J. Thomas
BY Andrew L. Bain
ATTORNEYS

United States Patent Office 2,988,719
Patented June 13, 1961

2,988,719
FLUID POTENTIOMETER FOR VERTICAL REFERENCE SYSTEM
Thomas J. Thomas, Verona, N.J., assignor to General Precision, Inc., a corporation of Delaware
Filed Dec. 24, 1959, Ser. No. 861,844
3 Claims. (Cl. 338—44)

This invention relates to vertical reference systems, and particularly to a pendulous electrolytic potentiometer device that is suitably adapted to control the operation of gyro-erecting motors for a vertical gyro.

A primary object of this invention is to provide a pendulous potentiometer having a pendulum and a main pivot support therefor normally above the level of the center of mass of the pendulum, and having a structural element to serve as a secondary pivot in co-operation with the main pivot, to support the pendulum about a pivotal axis through the main and the secondary pivot points with such axis temporarily established above the center of mass of the pendulum while the potentiometer is tilted from normal vertical position.

Another object of the invention is to provide a device having a pendulum construction that will establish a vertical reference, wherein the pendulum is generally free to move within an angular range limited only by construction dimensions, and wherein the pendulum serves to control an external erecting force generally in proportion to any displacement of the pendulum from true vertical, within said angular range, and wherein the pendulum is damped by immersion of the moving parts in a suitable fluid so as to prevent too rapid a response to external acceleration and deceleration forces.

Another object of this invention is to provide a pendulum construction that will permit maximum freedom of movement of the electrolyte through the pendulum to prevent entrapment of bubbles within the confines of the pendulum.

Another object is to provide a pendulus erecting system which has its vertical seeking components sealed in a chamber containing a fluid damping medium.

A further object is to provide a simple and compact erecting system which may be easily applied to be contained physically within an axial chamber of a gyro rotor.

Another object of this invention is to provide a gyro-erecting switching device that may be employed to control directly the current to be supplied to the gyro-erecting motors.

Another object of this invention is to provide a pendulous vertical erecting system which has its vertical seeking components sealed in a chamber containing a fluid that serves both as a damping medium and as a fluid electrical resistor of relatively high resistivity, whereby a potentiometer circuit may be established across a pre-determined path through the electrolyte, with the pendulum bob serving as a take-off terminal for that potentiometer circuit.

In accordance with this invention, a pendulum-controlled potentiometer utilizes an electrolyte confined in a symmetrical annular chamber concentric about a main central axis normally vertical. Two co-ordinate resistance paths are established through the electrolyte by two pairs of diametrically oppositely spaced and transversely disposed surface terminals. The two paths constitute two potentiometer circuits, with a co-axially pivoted pendulum bob serving as a freely swingable take-off terminal.

When the pendulum is in its normal vertical position, the take-off point represented by the pendulum bob is effectively co-axially disposed at the intersection of those two potentiometer circuit paths with the vertical central axis of the chamber. Under such conditions, each total potentiometer path consists of two equal series portions, between the outer surface of the pendulum bob and each terminal of each path. When the pendulum is vertical, both series portions of each path are equal.

Upon displacement from its normal vertical position, the pendulum bob shifts such neutral point of the two paths, and causes the two series portions of each path to be of different lengths and therefore of different resistance values. The potentiometer may thus serve to indate and measure the tilt of the pendulum.

For example, a gyroscope mounted on an aircraft will be affected by motion of the aircraft which may be subjected to acceleration forces, or to pitching forces or to rolling forces, or to sets of such forces. The pitching motion of the aircraft, which represents an angular movement of the aircraft in a vertical fore-and-aft plane, about a transverse horizontal axis, may be readily detected by a pendulus device in which a pendulum is supported for free movement about a pivot above its center of mass, since the pendulum will be deflected from normal vertical according to the acceleration of the craft although in opposite sense with respect to the point of support of the pendulum. A simultaneous rolling motion would cause an additional deflection of the pendulum in a transverse direction.

In a pendulous potentiometer heretofore made, a pendulum has been utilized as a movable pick-off terminal, dipping into a fluid electrolyte at some point in a path between two stationary terminals, to derive a voltage representative of the deflection of the pendulum from its neutral position. At such neutral position the pendulum would be in the middle or neutral position of the electrical path between the two stationary terminals. Upon deflection the pendulum bob would engage an outer encircling surface which would then serve as a secondary pivot point for the pendulum. However, in order to assure stability in the behavior and movement of a pendulum, the level of the pivot point should be higher than the level of the center of gravity of the pendulum.

In the electrolytic potentiometer of such type heretofore made, the pendulum has been suitably supported from a main pivot point located higher than the level of the center of gravity of the pendulum. When thus supported, the pendulum has been able to respond immediately and appropriately to any tilting or angular movement imposed on th pivot by an external carrier, such as an aircraft. However, such movement mainly through an angle in one vertical plane frequently has an angular component in a transverse vertical plane. Thus, when the carrier pitches in a fore-and-aft vertical plane, the pendulum tilts in the same plane. If such pitching movement is followed by a side-to-side roll, or has a transverse component, while the pendulum is still tilted due to the original pitching, the pendulum bob in the such prior potentiometer rests on a point which serves as a secondary pivotal point for movement of the bob in the transverse plane. But such secondary pivotal point is below the mass center of the pendulum, and the the pendulum is therefore in an unstable condition. Therefore, improper oscillation of the pendulum could result, with consequent false indication of the direction of the transverse component of movement of the carrier.

One of the main objects of this invention is, therefore, to provide an electrolytic potentiometer of such construction as to provide a universal secondary pivotal support point that will always be at a higher level than the center of mass of the pendulum bob, when the bob is already in tilted position, whereby the pendulum will be stable in its secondary pivoted position.

The manner in which the vertical erecting potentiometer is constructed and assembled, and the control circuit whereby the potentiometer controls the gyro-erecting motors, are illustrated in the accompanying drawings, in which FIGURE 1 is a vertical sectional view of an assembled vertical-erecting pendulous device embodying this invention;

FIGURE 2 is an enlarged sectional view of a region in the well and shows the relative disposition of a lower edge of the pendulum and the secondary cylindrical pivot step adjacent one of the terminal contact plates;

FIGURE 3 is a sectional view similar to FIGURE 2 with the pendulum bob tilted into engagement with the pivot step;

FIGURE 4 is a view showing the section of FIGURE 2 rotated through a right angle to illustrate an exaggerated condition of tilt and the manner in which the step pivotally supports the pendulum bob for subsequent angular movement transverse to the initial tilt angle;

FIGURE 5 is a symbolic view showing the relative balance position of the pendulum with respect to the stationary electrode terminal plates when the pendulum is supported from its main pivot in substantially vertical position; and FIGURE 6 is a view of the symbol in FIGURE 5, shown in tilted position to illustrate how a temporary auxiliary pivotal axis is established when the pendulum bob engages the structural step at a point on the inner surface of the bob, and to illustrate how the center of mass of the pendulum is at a level below such temporary pivotal axis;

FIGURES 7 and 8 are perspective views of two modifications of bubble-free pendulums for this invention; and FIGURE 9 is a diagram of a gyro control circuit in which the present invention is utilized; and FIGURE 10 is a schematic diagram showing the equivalency of the pendulous potentiometer in controlling one of the motors.

As shown in the drawings, a potentiometer 10 comprises a closed vessel 11 consisting of a hollow outer shell 11a and a base 12 secured at the lower end of the shell 11a. The shell and the base are preferably cylindrical and symmetrical about a main central vertical axis 13, which is vertical in the normal neutral position of the potentiometer 10. A cap 14 closes the upper end of the shell to constitute a hermetic seal. The vessel thus sealed contains a pendulum 15 pivotally supported on a pivot 16 at the top of a vertical center post 17 that is centrally anchored in the base 12.

The empty space 18 remaining in the closed shell is nearly filled with an electro-conductive electrolyte 19 of relatively high resistivity, except for a small evacuated space 20 at the top of the electrolyte under the top of the shell. The shell is shaped to embody an upper cylindrical portion 21 of relatively small diameter and a lower cylindrical portion 22 of larger diameter joined to the upper cylinder 21 by a frusto-conical section 23. The lower cylindrical portion 22 is provided with an annular boss or ring 24 which serves as a means for mounting the potentiometer shell in desired position.

The shell 11a is here shown as being preferably of metal. The base 12 is made of insulating material, here shown as being of glass, suitably metallized on its peripheral edge 27, to permit a hermetic seal to be formed at the bottom circular edge of the metal shell 11a between the metal shell and such metallized surface of the glass base by a suitable soldered bond 28.

To receive the shell on the base 12, the base is provided with a seat or shoulder 29 adjacent a side wall 31 that rises to a flat level surface 32 which will serve as the floor of a well 33 to receive the electrolyte and provide an operating space for the depending bob of the pendulum 15.

The pendulum 15 is of the same general outline as that of the outer shell 11a, and consists of an upper cylinder 41 of small diameter that serves as a support for a lower cylinder 42 of larger diameter. The lower cylinder is preferably of greater thickness to constitute the main weight and bob portion of the pendulum. The two cylindrical sections 41 and 42 are joined by a frusto-conical section 43. The top end of the upper supporting cylinder 41 encircles and is peened over a plug cap 45, which in turn grips a pivot bearing 46 that serves to support the pendulum. The pivot bearing 46 has a pivot cavity 47 co-axially and symmetrically formed in the bottom surface thereof, to position the pendulum on the pivot 16 of the supporting post 17. In its normal neutral position the pendulum will hang symmetrically and concentrically about the main axis 13.

In order to limit any shifting movement of the pendulum from its supporting pivot 16, in case the associated gyro is tumbled, a threaded limit screw 48 may be adjustably positioned to a distance spaced from the top of plug cap 45. Such spacing 49 is made less than the depth of the pivot cavity 47 in the bearing 46. Thus the pivot 16 can not move out of cavity 47.

After the shell is sealed to the base, the vessel is substantially filled with the electrolyte, through a small filling tube 51 extending through the cap 14. The vessel is first evacuated through the filling tube and then the electrolyte is fed into the space within the shell through that tube. Such space is filled to a level slightly below the top, to provide an empty expansion chamber to accommodate the electrolyte upon expansion when heated, without imposing hydraulic pressure on the vessel walls. After the vessel is thus substantially filled, the filling tube 51 is pinched off and sealed at its admission end 52.

In order to detect a change in position of the pendulum from its normal vertical position, two pairs of terminal plates 61, 61a, and 62 and 62a are disposed diametrically opposite each other in each pair. The two pairs are co-ordinately disposed within the space encircled by the pendulum bob 42. When the potentiometer is in its normal position, as shown in FIGURE 1, the pendulum is symmetrically concentrically disposed with respect to the main axis 13, and the bob portion 42 is so suspended that the inner surface 63 of the bob is equidistant from the front face surfaces of the four terminal plates 61, 61a, 62 and 62a.

Under normal conditions the resistances of the respective paths through the electrolyte between the bob 42 and the surfaces of each pair of those terminal elements 61, 61a, 62 and 62a are equal. Similarly, the resistance paths from the pendulum upper cylinder to the center post 17 are all equal while the pendulum is normal.

The pendulum bob serves as a common circuit point, to which an electrical connection may be made through the center post 17.

Thus, a path extends from the center post 17, as the neutral point of the electric control circuit, to each of the four terminal plates 61, 61a, 62 and 62a. Each path includes two portions. One portion is in the electrolyte between the center post 17 and the inner surface of pendulum upper cylinder 41. The other portion of the path is in the electrolyte between the inner surface of the pendulum bob and each terminal plate.

The pendulum, through its bob, thus serves as a freely-movable take-off terminal in the electrolyte, which in effect establishes two co-ordinate potentiometer resistance paths between the two co-ordinately disposed terminal pairs.

When the potentiometer tilts, the pendulum bob moves closer to one of the terminal plates and reduces the resistance between the pendulum bob and that terminal plate. At the same time, the distance between the pendulum bob and the diametrically opposite mate of the terminal pair is increased, and the resistance of that path portion is correspondingly increased.

When the potentiometer is mounted on an aircraft, for example, and the aircraft changes position through a pitch angle, the potentiometer will be tilted and the pendulum bob will be moved from its neutral position in the plane of tilt. The permitted angle of movement for the pendulum is relatively small and it will ordinarily move immediately to the limit of its tilt position, at which the lower inner edge 55 of the pendulum bob will engage the top edge or corner of bottom wall border 56, just below the level of the bottom horizontal edge of an adjacent terminal plate. This border surface 56 constitutes a cylindrical stop, concentric about axis 13, and is disposed radially a short distance 69 beyond and in front of the cylindrical locus of the front surfaces of the terminal plates, and within the circular limit of the pendulum bob.

Consequently, when the potentiometer is tilted, the pendulum bob will engage that stop surface 56, as indicated in FIGURE 3, and will be stopped a short distance from the adjacent terminal plate. For illustrative purposes, that distance is shown exaggerated. The tilt is exaggerated to an extreme angle in FIGURE 4 in order to illustrate this feature of this invention. The bob of the pendulum now rests on the stop surface 56. The diameter of the bob 42 is larger than the diameter of the stop surface 66 and the contact area at the point 70 is sufficiently small to serve as a pivotal point for the pendulum bob 42. At the same time, the upper end of the pendulum is still pivoted on the pivot 16 on the center post 17. The pivot point 16 and the pivotal point 70 now serve as bearing points to define a virtual pivotal axis 95 that is always higher than the level of the center of gravity of the pendulum. Thus in any tilted position of the pendulum, its center of gravity is below the pivotal axis, and the pendulum is therefore in stable condition relative to such pivotal axis, as shown in FIGURE 6.

Now, if, while the pendulum is in position shown in FIGURE 4, the carrier should move through an angle in a direction other than the direction of the original angular movement which caused the initial tilt to the position in FIGURE 4, then the pendulum will tend to move in such a second direction corresponding to such subsequent angular movement of the carrier.

The significant action which now occurs, as shown schematically in FIGURE 6, is that the pendulum is suspended as a beam between the pivotal point 70 on the stop surface and the main pivot 16 on the center post 17. The pendulum as a whole is free to swing about the axis between the two bearing points represented by the two supporting pivot points 16 and 70. The pendulum bob is therefore in a stable pendulous condition.

Thus, by means of the circular stop surface 56, within the contour circle of the bob, any point of contact between the inside surface of the pendulum bob and the stop surface 66 becomes a temporary pivotal bearing point which co-operates with the main permanent pivot 16 to define a temporary pivotal axis for the pendulum. Since the center of gravity of the pendulum is always below such temporary pivotal axis, the pendulum is in a stable position. The concentric location of the stop surface 56 provides a possible pivotal point over its entire surface edge for contact with any point on the inner surface of the pendulum bob.

As shown in FIGURES 1 and 9, the front faces of the terminal plates 61, 61a and 62, 62a, are shaped to conform to a cylindrical curved surface concentric with the main axis 13. The cylindrical pendulum bob 42 is also concentric in neutral position. The gap or space 65 from contact 61 to the bob 42 and space 66 from bob 42 to contact 61a defines one potentiometer path, and the space 67 from contact 62 to the bob 42 and the space 68 from bob 42 to the contact 62a defines the other potentiometer path.

When the pendulum bob 42 is in its neutral central concentric position within the cup, the bob will be equidistantly spaced from each of the terminal plates 61, 61a, 62 and 62a inclusive, as shown in FIGURE 9. Since the bob constitutes, in effect, a movable contact member, the resistance between the bob and any one of the terminal plates may be varied. In the neutral position of the bob, the gaps or spaces 65, 66, 67 and 68 between the bob and the respective terminal plates 61, 61a, 62 and 62a, inclusive, will be substantially equal. As the bob swings away from its neutral position, however, the resistance through any one gap in either path will be diminished as the bob moves closer to the corresponding terminal plate, and, conversely, the resistance through the diametrically opposite gap of that path will be increased as the bob moves away from that corresponding terminal plate. The center post 17 on which the bob is supported, serves as a terminal for connection to an external circuit.

The electrolyte may be considered to be substantially homogeneous and isoconductive. The resistance of a path between a pair of opposite terminal plates may be considered to remain substantially constant, when the bob moves only in a direction along the central diameter as the path between them, since the sum of the two gaps between that pair of terminal plates and the bob will remain substantially constant as the bob shifts from its neutral position along the straight line between the two terminal plates. However, the voltage distribution will vary between the two gaps, and, for present purposes, such voltage distribution may be considered to be linear functions of the respective lengths of the two gaps.

Considering the two gaps between the pendulum bob and a pair of opposite terminal plates to represent a potentiometer resistor, the pendulum bob will serve as a take-off contact point along that potentiometer resistor. As the pendulum shifts its position relative to the terminal plates, the effective position of the pendulum as a take-off terminal on that resistor will correspondingly move or shift, and the corresponding changes in voltage drops across the two gaps of the path may be utilized to control an external circuit.

Where the pendulum bob swings along one path between one pair of opposite terminal plates, the symmetrical equality of the two gaps constituting the lateral or transverse path through the electrolyte will not be disturbed, and consequently there will be no change in the voltage drop distribution across those two transverse or lateral gaps.

However, where the pendulum movement may be in a direction oblique to both paths, and therefore have a component of movement in each path, the effect of that movement will be to shift the take-off point with respect to both potentiometer circuit paths as set up by the four terminal plates.

In order to impose symmetrical limits on the oscillating movement of the bob 42, the step surface 66 in front of the face surfaces of the terminal plates is disposed in a concentric cylindrical locus. Thus, the maximum movement which the pendulum may enjoy in any lateral direction will always be the same.

In order that the end or edge face of the pendulum will be substantially parallel to the terminal plates 61 to 62 inclusive, in the extreme lateral position of the bob, the face of the bob is tapered slightly radially inward and downwardly as illustrated in exaggerated form in FIGURE 3.

As further shown in FIGURE 9, the pendulum controls the energization of a motor 75 and a motor 76, from an external circuit 77. The motor 75 is two-phase and has a winding 75a to serve as a fixed excitation phase and a split winding 75b to serve as a variable signal or excitation phase, for controlling quantity and direction of torque. The motor 76 is similarly two-phase and has a fixed-phase winding 76a and a split signal winding 76b. The two motors 75 and 76 here represent two torque motors for two gimbals of a gyroscope. One terminal of the external supply circuit 77 is connected to the center post 17, and thereby to the pendulum bob 42, the other terminal of the circuit 77 being grounded.

Movement of the pendulum 42 to the right, on the horizontal line between terminals 61 and 61a, for example, will shorten gap 65 and lengthen gap 66. The effect may be immediately understood, upon reference to FIGURE 10, which shows the effect on one motor only.

The fluid paths in the two gaps 65 and 66 between terminals 61 and 61a, in FIGURE 9, constitute a potentiometer, in effect, as represented by potentiometer elements 65a, 66a, in FIGURE 10. The pendulum 42 corresponds, in action and effect, to the movable terminal 42a in FIGURE 10.

As the pendulum 42 approaches terminal 61, the effective resistance 65a diminishes and the effective resistance 66a increases. Consequently, more energy is supplied to winding section 75b–1 than to the winding section 75b–2. Upon movement of the pendulum 42 in the opposite direction, closer to terminal plate 61a, more energy is supplied to winding section 75b–2. Directional control of the torque in the torque motor 75 is thus established to impose the necessary torque to control the associated gyroscope as required to restore the pendulous potentiometer 10, as a whole, to verticality.

In similar manner, if the pendulous potentiometer 10 is tilted with a component of tilt along the transverse line between terminal plates 62 and 62a, the winding 76b–1 or 76b–2 of torque motor 76 will be energized to torque the associated gyro to re-establish verticality of the pendulous potentiometer 10.

One of the features sought in a pendulous potentiometer, such as here disclosed, is to prevent entrapment of any bubbles in the pendulum structure. The pendulum shown in FIGURE 1 may be provided with holes variously disposed in the supporting tube. Other suitable variants of the pendulum are briefly shown in FIGURES 7 and 8, which permit free exist of bubbles from the pendulum during filling of the housing.

In FIGURE 7, the pendulum 81 has a supporting tube 82, with long slots or windows 83, a bob 84 and a connecting strip 85.

In FIGURE 8, a pendulum 90 has a bob 91 suspended from a pivot bearing 92 by a cage 93 consisting of several wire elements disposed as shown and secured in grooves 94 on the outer surface of the bob 91.

The construction shown provides a single pendulous potentiometer that is pendulously stable in normal and in tilted positions. The details of construction may be variously modified within the spirit and scope of the invention and within the scope of the claims.

What is claimed is:

1. A pendulous potentiometer comprising:

a vessel having a main axis and a chamber symmetrical about said axis, and having an outer cylindrical wall and an inner re-entrant bottom wall spaced from the outer wall to define an annular well at the bottom of the chamber, the well being concentric with said axis and the inner wall having an annular step shoulder extending into the well concentrically about said axis;

a center post supported and disposed co-axially within the vessel with the bottom of the post anchored on the bottom wall of the vessel and the top of the post free and shaped to serve as a pivot, the pivot being integral with the center post, a pendulum having a pivot bearing to seat on said center post pivot, and being shaped to be symmetrical about said axis when in normal vertical position, and having a cylindrical bob portion to depend into said concentric annular well of the vessel, with the lower edge of the bob portion sized sufficiently below the level of the annular shoulder on the inner wall of the well to enable the bob to engage the side surface of said shoulder when the potentiometer as a whole is tilted in one plane to shift its axis out of normal vertical, whereby and whereupon said shoulder then temporarily serves as a second pivot, at the point where the shoulder side surface is engaged by the cylindrical bob, to enable the bob to function as a stable pendulum to detect angular movement of the potentiometer as a whole in a plane transverse to the original tilt plane, arcuate terminal surface plates coordinately spaced and shaped to be flush with the inner wall of the well, with terminals extending from the respective terminal plates through the vessel wall for connection to an external circuit; and a cylindrical step on the cylindrical inner wall of the well, concentric with the main axis and extending radially only a small distance beyond the front arcuate surfaces of the terminal plates to serve as a stop for the cylindrical bob portion of the pendulum to prevent physical engagement of the terminal plates while still in the initial tilted condition.

2. A pendulous potentiometer for detecting and responding to accelerations, first about one horizontal axis of oscillation, and then, second, about a co-ordinate horizontal axis, such potentiometer comprising:

a closed vessel having a chamber to receive and hold a filling charge of electro-conductive fluid electrolyte, the chamber having a main axis and being symmetrical about such axis which is normally vertical, and said chamber including an annular well defined by an outer cylindrical wall and a re-entrant cylindrical inner wall rising from the vessel bottom;

a pendulum concentrically symmetrical about said main axis when suspended vertically, and having a co-axially disposed pivot bearing for support and a concentric cylindrical bob to extend downward into the annular well;

a main pivot physically secured to and supported on and within the vessel to provide an elevated pivot point on the main axis for the pivot bearing of the pendulum, to enable the pendulum to swing in any direction about said pivot point;

pairs of individual arcuate terminal surface plates co-ordinately spaced and shaped to be flush with the inner wall of the well, with terminals extending from the respective plates through the vessel wall for connection to an external circuit;

and a cylindrical step on the cylindrical inner wall of the well, concentric with the main axis and extending radially only a small distance beyond the front arcuate surfaces of the terminal plates to serve as a stop for the cylindrical bob of the pendulum to prevent physical engagement of the terminal plates by the pendulum bob, and then to serve as a pivot for the cylindrical bob of the pendulum if the potentiometer as a whole should be subjected to additional transverse angular or tilting movement while still in the initial tilted condition.

3. A pendulous potentiometer comprising: a vessel having a chamber to be filled with and to confine an electro-conductive electrolyte in a space symmetrical about the main axis of the vessel in the chamber being symmetrical about the main axis which is normally vertical, and said chamber including an annular well defined by an outer cylindrical wall and a re-entrant cylindrical inner wall rising from the vessel bottom; a pendulum having a pivot bearing for support and a cylindrical bob element to dip into the electrolyte; a first pivot for supporting the pendulum at its pivot bearing; and a second pivot for supporting the pendulum at its bob element when the main axis of the vessel is off vertical, said potentiometer including a pair of diametrically spaced terminal plates supported within the limits of the cylindrical bob element for detecting a tilt of the potentiometer in one vertical plane; and a second pair of diametrically and co-ordinately spaced individual terminal plates likewise supported within the limits of the cylindrical bob element for detecting a tilt of the potentiometer in a co-ordinate vertical plane while it is still tilted in the first vertical plane, and terminal pins respectively connected to each of the terminal plates and to the metallic pivot post, said pins extending out through the base to serve as connection terminals for external circuits, arcuate terminal surface plates coordinately spaced and shaped to be flush with the inner wall of the well, with terminals extending from the respective plates through the vessel wall for connection to an external circuit.

References Cited in the file of this patent

UNITED STATES PATENTS 2,751,472    Heimann    June 19, 1956
2,751,474    Reichel et al.    June 19, 1956